United States Patent
Tsay et al.

(10) Patent No.: US 7,162,200 B2
(45) Date of Patent: Jan. 9, 2007

(54) ANTENNA CALIBRATION SYSTEM AND METHOD

(75) Inventors: Jinn-Jy Tsay, Taipei (TW); I-Chung Sung, Taoyuan (TW)

(73) Assignee: Chung Shan Institute of Science and Technology, Taoyuan (TW)

( * ) Notice: Subject to any disclaimer, the term of this patent is extended or adjusted under 35 U.S.C. 154(b) by 495 days.

(21) Appl. No.: 10/249,512

(22) Filed: Apr. 15, 2003

(65) Prior Publication Data
US 2004/0209574 A1 Oct. 21, 2004

(51) Int. Cl.
*H04H 1/00* (2006.01)

(52) U.S. Cl. .................. 455/3.02; 455/3.06; 455/66.1; 455/67.14; 342/174; 342/149; 342/151; 348/113; 348/117; 348/121; 348/123

(58) Field of Classification Search ............... 455/3.02, 455/3.06; 342/174, 151, 149
See application file for complete search history.

(56) References Cited

U.S. PATENT DOCUMENTS

| | | | | |
|---|---|---|---|---|
| 5,734,356 A | | 3/1998 | Chang | 343/882 |
| 5,808,583 A | * | 9/1998 | Roberts | 342/359 |
| 5,977,906 A | | 11/1999 | Ameen et al. | 342/174 |
| 6,339,399 B1 | * | 1/2002 | Andersson et al. | 342/372 |
| 6,700,536 B1 | * | 3/2004 | Wiegand | 342/417 |
| 6,741,205 B1 | * | 5/2004 | Nagasaku | 342/174 |
| 6,753,823 B1 | * | 6/2004 | Matz et al. | 343/760 |
| 6,795,033 B1 | * | 9/2004 | Matz et al. | 343/760 |
| 6,850,202 B1 | * | 2/2005 | Watson | 343/766 |
| 6,889,421 B1 | * | 5/2005 | Matz et al. | 29/600 |
| 6,906,673 B1 | * | 6/2005 | Matz et al. | 343/760 |
| 6,933,883 B1 | * | 8/2005 | Isaji | 342/174 |
| 6,937,188 B1 | * | 8/2005 | Saunders et al. | 342/359 |

* cited by examiner

*Primary Examiner*—Marceau Milord
(74) *Attorney, Agent, or Firm*—Jiang Chyun IP Office

(57) ABSTRACT

An antenna calibration system consists mainly of a signal source, an antenna, a first radio frequency mixer, a first local oscillator, an power detecting device, a personal computer, and a servo amplifier. The signal source emits a signal, and the antenna receives the signal. The signal and the first local oscillator, which emits a signal, are emitted into the first radio frequency mixer. Then the first radio frequency mixer emits a signal into the energy detecting device which calculates the signal power, and transmits the power into the personal computer. The personal computer calculates the powers, and then transmits an angle control signal into the servo amplifier. The servo amplifier amplifies the signal, and then drives the antenna pedestal to turn until the antenna is aimed at the signal source. This can calibrate exactly the antenna's azimuth and elevation offset angle.

6 Claims, 5 Drawing Sheets

ANTENNA CALIBRATION SYSTEM AND METHOD

BACKGROUND OF INVENTION

1. Field of the Invention

The present invention generally relates to an dish antenna calibration system and a method that applies the same, and more particularly, to a system inside a dish antenna for calibrating the RF pointing and a method that applies the same.

2. Description of the Related Art

The former antenna related calibration technology is the U.S. Pat. No. 5,734,356 (approved on Jun. 7, 1996), which discloses a portable disk antenna in which the mechanical structure is mainly discussed. The azimuth and elevation deviation of a disk antenna are calibrated by a compass and a level instrument respectively. However, this method can not make sure the beam aiming is precise. Additionally, the U.S. Pat. No. 5,977,906 (approved on Nov. 2, 1999) discloses an apparatus and a method for calibrating azimuth bore sight of a antenna azimuth in a radar system. The antenna is installed on a mobile vehicle and used to find a calibration target. At first, a target range and a azimuth angle are measured, then the vehicle is moved and the second target range and the azimuth angle are measured again. The inclination of both measures is used to calculate a calibration offset angle. However, this patent only discloses the method for calibrating but discloses nothing relating to its precision.

FIG. 1 is a diagram schematically showing the relationship between the elevation mechanical 0° of a conventional antenna and the pointing beam. Referring to FIG. 1, the antenna's elevation mechanical 0° 104 can be deployed to point it to the ground horizontal 0° 104, and an inclination between the antenna elevation and the horizontal line can be obtained by using the level instrument. However, for those antenna beam widths that are quite narrow, applying either method can result in an error beyond an allowable range of the system. Therefore, even if the azimuth and the antenna elevation mechanism are precisely calibrated; it is difficult to determine whether the mechanical elevation 0° and the horizontal 0° of the antenna beam are the same or not.

SUMMARY OF INVENTION

The present invention is made against such a background and its objective is to provide an antenna calibration system and a method that applies the same, so as to precisely measure an antenna's azimuth and elevation offset angle.

In order to achieve the objective mentioned above, an antenna calibration system and a method for such calibration are provided by the present invention. The antenna calibration system consists of a signal source, an antenna, a first radio frequency mixer, a first local oscillator, an energy detecting device, a personal computer, and a servo amplifier. Wherein, the signal source is portable and is used to radiate a first signal, e.g., a microwave signal. Moreover, the antenna in a fixed position and at a certain distance from the signal source is used for receiving the first signal.

The first signal is subsequently transmitted to the first radio frequency mixer via a waveguide after the antenna. The first local oscillator of the present invention that is electrically connected to the first radio frequency mixer transmits a second signal to the first radio frequency mixer. The first signal and the second signal are down mixed to a third signal, wherein the third signal comprises an intermedium frequency signal.

The first radio frequency mixer also electrically connects to the energy detecting device. Therefore, the third signal is transmitted to the energy detecting device from the first radio frequency mixer, and the power of the third signal is measured by the energy detecting device. The personal computer is electrically connected to the energy detecting device, so that the measured power value of the third signal can be transmitted to the personal computer, and calculated by the personal computer, an angle control signal is output to the servo amplifier that is electrically connected to the personal computer. The servo amplifier amplifies the angle control signal, and then drives the antenna until the antenna is aimed at the signal source. This can calibrate the antenna's azimuth and elevation offset angle precisely.

The second local oscillator inside the energy detecting device of the present invention consists mainly of a direct digital synthesizer, a digital to analog converter, a lowpass filter, and an amplifier. Wherein, the direct digital synthesizer generates a digital signal, and the digital signal is converted to an analog signal via the digital to analog converter, then the unwanted frequency noises are filtered by the lowpass filter. Afterwards, the signal is amplified by the amplifier and subsequently input to a second radio frequency mixer.

The energy detecting device of the present invention consists mainly of a second local oscillator, a second radio frequency mixer, a bandpass filter, a logarithm amplifier, an analog to digital converter, and a microcontroller. Wherein, the second local oscillator defined as a fourth signal input to a second radio frequency mixer, down mixes with an third signal to form a fifth signal. The fifth signal is then input to the bandpass filter that is electrically connected to the second radio frequency mixer. Part of the fifth signal is filtered in the bandpass filter, and the unfiltered part of the fifth signal is transmitted to the logarithm amplifier, the output of the logarithm amplifier which magnitude is proportional to the input power is input to the microprocessor to obtain the power of the signal. Finally, the power value of the signal is sent to the personal computer.

Moreover, the apparatuses mentioned above are mainly used by the calibration method of the present invention for performing a calibration process. Wherein, the antenna is attached to an antenna pedestal, and the control instruction for the direction of the antenna pointing is performed and modified by the data stored in the personal computer as well as the power value measured by the energy detecting device. The calibration method comprises the following steps: (a) choosing a calibration point, geodetic survey its coordinate, locating a signal source on the calibration point, and obtaining an inclination $\Theta_{cal}$ of the true cal north; (b) performing a wide range fast scanning (each interval=/<0.5 degree), drawing a diagram of the receiving power pattern, pointing the antenna to the orientation with a maximum signal power; (c) performing a second big azimuth scanning of the antenna (each interval=/<0.2 degree), so as to obtain a degree that approaches the maximum power value, however, since the interval is only 0.2 degree, the degree that is pointed by the antenna beam is still erroneous; (d) obtaining a position that has a 3 dB away from the point with the maximum power in the power pattern, performing a third small azimuth scanning of the antenna, so as to obtain the other point of the symmetric pattern that has the same power, and the arithmetic mean of these two points ($\Theta_{az}$) is the position that has the maximum signal power, that is also the precise azimuth value when the antenna beam is aimed to the location of the signal source; (e) the procedure for obtaining the elevation angle value ($\Theta_{el}$) is the same as obtaining the azimuth value;

(f) checking and determining whether the antenna is pointing to the signal source or not, driving the antenna with the condition of using $\Theta_{az}$ and $\Theta_{el}$ as a center and a deviation angle ($\Delta\varnothing=0.5$ degree) as a radius (like conical scan), then the received power is used as a radius for drawing a diagram of the received power, wherein if the diagram indicates that it is a circle or a symmetric eclipse, it means that the pointing of the antenna is precisely at the direction of the signal source; (g) the offset angle ($\Theta_{off}$)=the geodetic survey angle ($\Theta_{cal}$)–the measured angle ($\Theta_{az}$); (h) placing the signal source on the other calibration point T, and geodetic survey the inclination $\Theta_T$ of the true north 0°, and repeating the steps (b)~(f), so as to obtain an angle value 19$\Theta_{ilr}$ that is measured by the personal computer. The experiment indicates that $\Theta_{ilr}$ is between $\Theta_T+0.2$ and $\Theta_T-0.2$ degree, if the error is greater than 0.2 degree, then steps (a)~(g) are repeated, so that an ideal calibration value can be obtained.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings.

DETAILED DESCRIPTION

Figure 1:
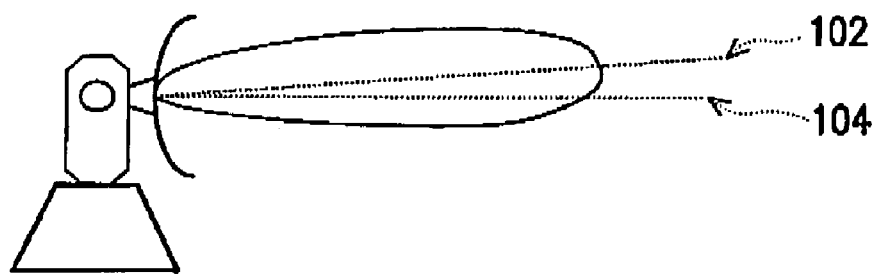
FIG. 1 is a diagram schematically showing the relationship between the elevation mechanical 0° of a conventional antenna and the pointing beam.
Figure 2:
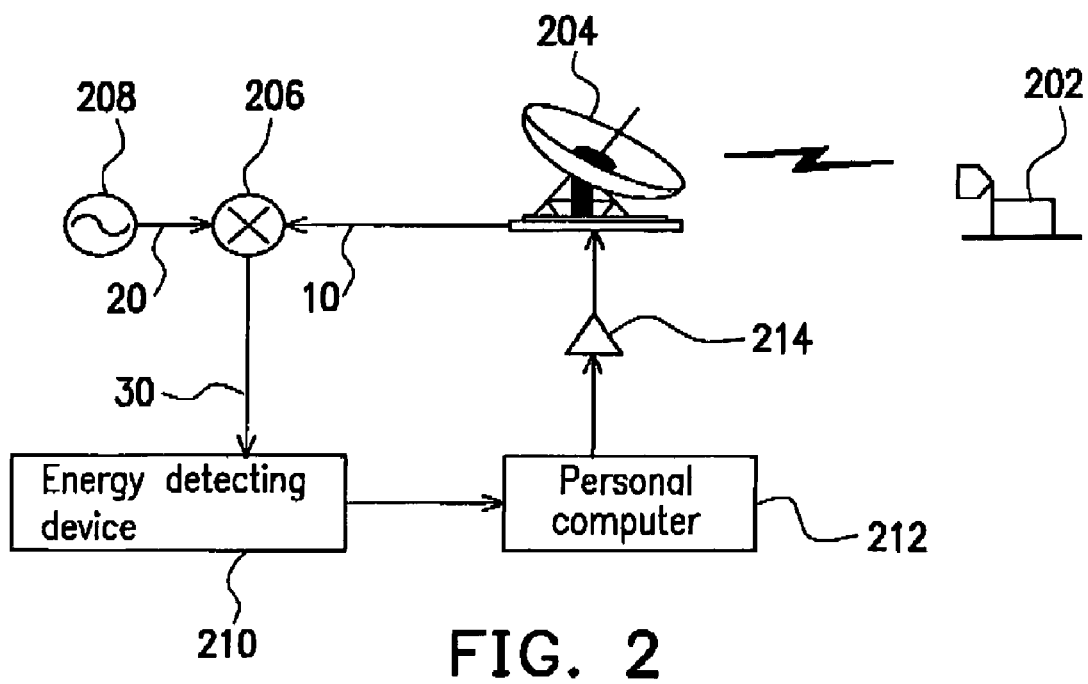
FIG. 2 schematically shows a configuration diagram of the antenna calibration system for a preferred embodiment according to the present invention.

FIG. 2 schematically shows a configuration diagram of the antenna calibration system for a preferred embodiment according to the present invention. Referring to FIG. 2, the antenna calibration system mainly consists of a signal source 202, an antenna (including a pedestal) 204, a first radio frequency mixer 206, a first local oscillator 208, an energy detecting device 210, a personal computer 212, and a servo amplifier 214. Wherein, the signal source 202 is portable and is used to emit a first signal 10, e.g. a RF signal. After the first signal 10 is received by the antenna 204, the received first signal is subsequently transmitted to the first radio frequency mixer 206 via a waveguide. Then, the first signal 10 is mixed with a second signal 20 input from the first local oscillator 208 and its frequency is converted to form a third signal 30 in the first radio frequency mixer 206.

Following on the descriptions above, the third signal 30 is formed after the frequency is reduced, and for example, the third signal 30 is an intermediate frequency signal. Then, the third signal 30 is transmitted to the power detecting device 210, and the power of the third signal 30 is read by the energy detecting device 210. The measured power value is transmitted to the personal computer 212, after it is calculated and compared by the personal computer 212; an angle control signal is output by the personal computer 212. Finally, the servo amplifier 214 amplifies the angle control signal, and then drives the antenna 204 to turn until the antenna 204 is aimed at the signal source 202. This can calibrate the antenna's azimuth and elevation offset angle precisely.

Figure 3A:
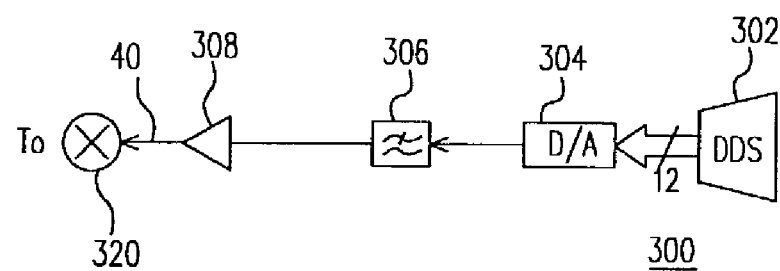
FIG. 3A schematically shows a circuit diagram of the second local oscillator inside an energy detecting device of a preferred embodiment according to the present invention.

FIG. 3A schematically shows a circuit diagram of the second local oscillator inside the energy detecting device of a preferred embodiment according to the present invention. Referring to FIG. 3A, the second local oscillator mainly consists of a direct digital synthesizer 302, a digital to analog converter 304, a lowpass filter 306, and an amplifier 308. Wherein, the direct digital synthesizer 302 generates a digital signal and transmits it to the digital to analog converter 304 where the digital signal is converted into an analog signal.

Then, the unwanted frequency noise in the analog signal is filtered by the lowpass filter 306, so that the portion of the signal with lower frequency is passed by the lowpass filter 306 and transmitted to the amplifier 308. The signal with a lower frequency is amplified by the amplifier 308 to generate a fourth signal 40, and the fourth signal 40 is subsequently transmitted to the second radio frequency mixer 320.

Figure 3B:
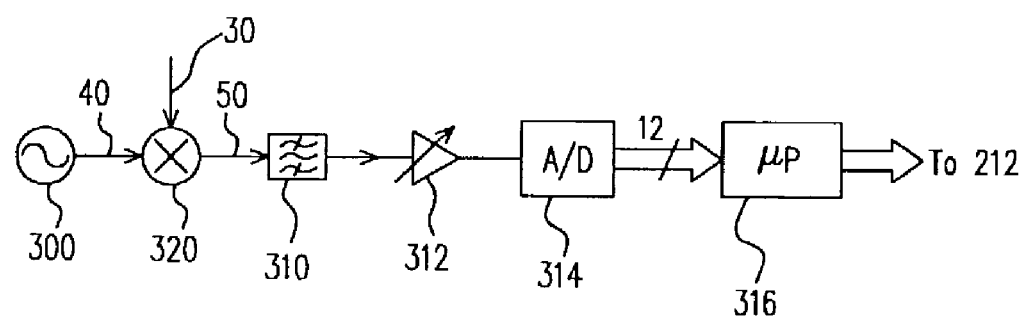
FIG. 3B schematically shows a circuit diagram of the energy detecting device for a preferred embodiment according to the present invention.

FIG. 3B schematically shows a circuit diagram of the energy detecting device for a preferred embodiment according to the present invention. Referring to FIG. 3B, it mainly consists of a second local oscillator 300, a second radio frequency mixer 320, a bandpass filter 310, a logarithm amplifier 312, an analog to digital converter 314, and a microcontroller 316. Wherein, the second local oscillator 300 inputs a fourth signal 40 to a second radio frequency mixer 320, mixes it with an input third signal 30, and converts its frequency to form a fifth signal 50, and the fifth signal 50 comprises an intermediate frequency signal. The fifth signal 50 is then input to the bandpass filter 310 that is electrically connected to the second radio frequency mixer 320. Part of the fifth signal 50 transmitted by the second radio frequency mixer 320 is filtered in the bandpass filter 310.

Then, the unfiltered part of the fifth signal 50 is transmitted to the logarithm amplifier 312 and then output a voltage which magnitude is proportional to the signal power. The voltage signal from logarithm amplifier 312 is subsequently sent to the analog to digital converter 314 in which the analog signal is converted into a digital signal. The digital signal is then transmitted to the microprocessor 316 so as to calculate a power value, and the calculated power value is transmitted to the personal computer 212 to perform the antenna pointing calibration operation.

Figure 4:
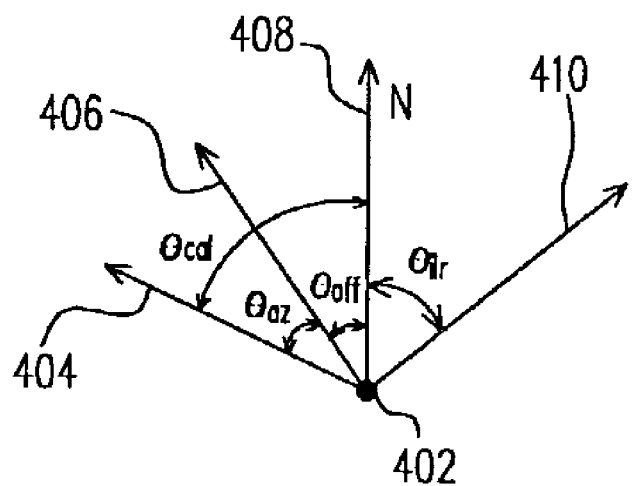
FIG. 4 is a diagram schematically showing a relative position of each of the coordinates.

The calibration method of the antenna system according to the present invention is suitable for obtaining a azimuth offset angle and a elevation offset angle of the antenna system. The antenna calibration system comprises the following steps:

(a) FIG. 4 is a diagram schematically showing a relative position of each of the coordinates. Referring to FIG. 4, at first, a calibration point is selected, and then an inclination $\Theta_{cal}$ of the true north 0° 408 is precisely measured via an geodetic cal survey. The signal source 404 is then placed on the calibration point, and the signal generated by the signal source 404 is received by the antenna 402. Moreover, 406 represents a mechanical 0° pointing of the antenna base (azimuth).

Figure 5:
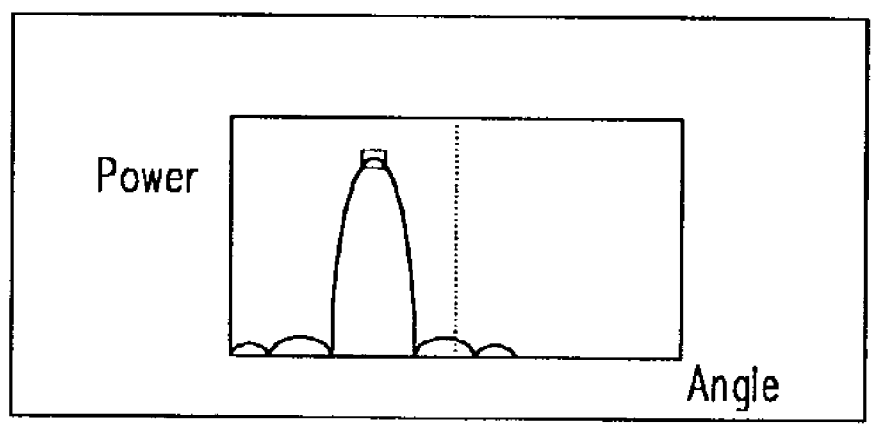
FIG. 5 schematically shows a pattern of the power received during the fast scanning.

(b) The antenna 402 is rotated to roughly point to the signal source 404, and a ±10 degrees fast scanning (each interval=/<0.5 degree) is performed so as to draw a pattern of the received power. FIG. 5 schematically shows a pattern of the power received during the fast scanning. Referring to FIG. 5, an angle with maximum power is obtained, and the antenna is subsequently aimed to an orientation having the maximum signal power.

Figure 6:
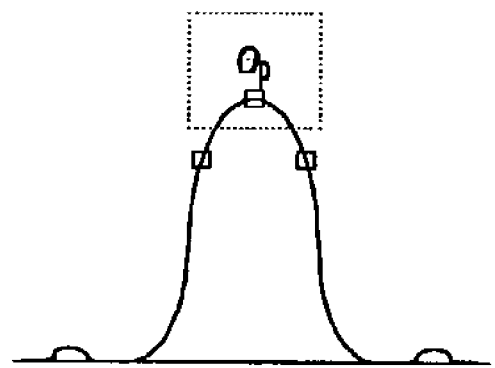
FIG. 6 is a diagram schematically showing a power field diagram of the wide range azimuth scanning.
Figure 6A:
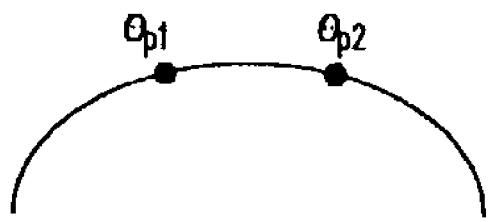
FIG. 6A schematically shows a magnify diagram of the position near by $\Theta_p$.

(c) FIG. 6 schematically shows a pattern of the power received during the big azimuth scanning. Referring to FIG. 6, when the big azimuth scanning with interval=/<0.2 degree is performed to obtain the maximum value of the signal power, the inclination of the antenna 402 and the signal source 404 is $\Theta_p$. However, since the scan interval=/<0.2 degree, an error still exists between $\Theta_p$ and the angle that the antenna beam actually aims to. This is as shown in FIG. 6A that schematically shows a magnified diagram of the position near $\Theta_p$. Therefore, it is hard to determine which one of $\Theta_{p1}$ or $\Theta_{p2}$ has a maximum value.

Figure 6B:
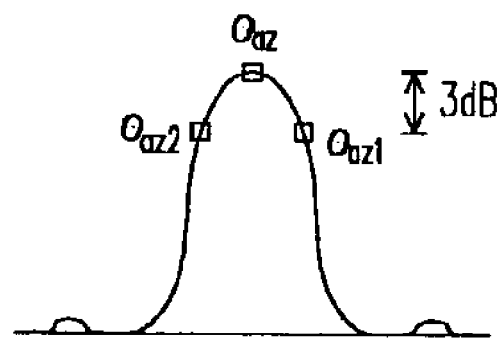
FIG. 6B is a diagram schematically showing the relative position of $\Theta_{az}$, $\Theta_{az1}$, and $\Theta_{az2}$.

(d) FIG. 6B schematically shows a relative position diagram of $\Theta_{az}$, $\Theta_{az1}$ and $\Theta_{az2}$. Referring to FIG. 6B and FIG. 6, after the power of a position $\Theta_p$ is measured with an interval less than 0.2 degree, the position with a power after 3 dB attenuation, e.g. a position with an angle of $\Theta_{az1}$ is measured. Then, the other point with the same power as the symmetry waveform, e.g. a position with an angle of $\Theta_{az2}$ is further measured. The arithmetic mean of these two power positions is the azimuth value $\Theta_{az}=(\Theta_{az1}+\Theta_{az2})/2$ when the antenna beam 402 aims to the location of the signal source 404 precisely. Therefore, $\Theta_{az}$ is the azimuth value when the antenna beam 402 aims to the signal source 404.

(e) The procedures for obtaining the elevation angle value $\Theta_{el}$ of the antenna are the same as the procedures used to obtain the azimuth value $\Theta_{az}$ of the antenna.

Figure 7:
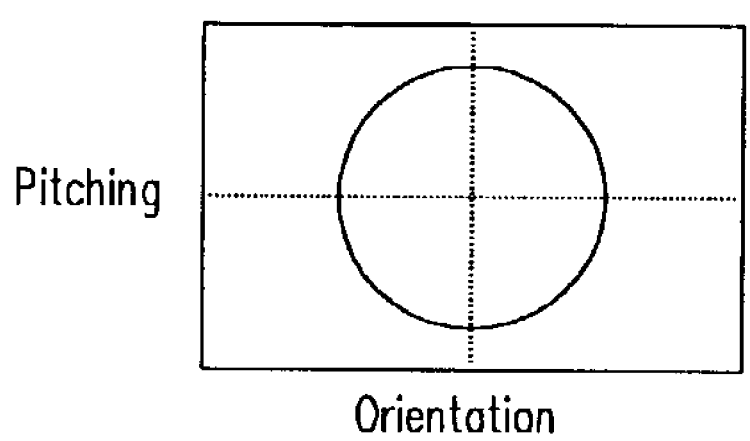
FIG. 7 schematically shows a field diagram of the power received during the circular scanning.

(f) After $\Theta_{az}$ and $\Theta_{el}$ are obtained, it is determined whether the antenna 402 aims to the signal source 404 or not. The $\Theta_{az}$ and $\Theta_{el}$ pointed by the antenna 402 are used as center, and a deviation angle ($\Theta\emptyset=0.5$ degree and is better to be smaller than $\Theta_{3dB}$) is set as a radius to rotate the antenna 402 (like a conical 3 dB scan). The power received by the antenna 402 is used as a radius for drawing a diagram of the power received by the antenna 402. Referring to FIG. 7, if the power pattern is a circle or a symmetric ellipse, it means the pointing position of the antenna 402 is right at the position of the signal source 404.

(g) Referring to FIG. 4, the angle value of $\Theta_{cal}$ is obtained, the azimuth offset angle $\Theta_{off}$ is the value of subtracting $\Theta_{az}$ from $\Theta_{cal}$, wherein the offset angle $\Theta_{off}$ of azimuth and elevation also can be obtained with the same method.

(h) Referring to FIG. 4, if the signal source 202 is located as an object on the other calibration position, T410, and the inclination $\Theta_T$ between the position T410 and the true north 0° is precisely measured via the geodetic survey. Steps (b)~(f) are repeated to measure the inclination $\Theta_{ilr}$ between the position T410 and the true north 0°. In order to have the antenna 204 point to the position T410, it is known from FIG. 4 that the antenna 204 has to rotate a degree of $\Theta_{ilr}+\Theta_{off}$ from mechanical 0° 406, i.e., the mechanical angle of the antenna=shooting angle+offset angle. Moreover, it is known from experiment results that $\Theta_{ilr}$ can achieve a precision of $\Theta_T±0.2$ degree, when the error is greater than 0.2 degree, the steps (a)~(g) are repeated, so that the ideal precision for calibration can be obtained.

In order to describe it more clearly, an example is used here for explanation, the offset angle of the antenna on some location can be obtained as:

the azimuth offset angle=311.46°;

the elevation offset angle=0.65°.

Moreover, a signal source is placed on the other calibration point, and the angles corresponding to the antenna measured by the geodetic survey are:

azimuth=343.8°;

elevation=2.41°.

The calibration point is calibrated by the method mentioned above, then the data is recoded as follows:

| | | Azimuth | Elevation |
|---|---|---|---|
| 1 | Shooting angle | 343.77° | 2.42° |
| | Offset angle | 311.46° | 0.65° |
| | Mechanical angle | 295.23° | 3.07° |
| 2 | Shooting angle | 343.79° | 2.27° |
| | Offset angle | 311.46° | 0.65° |
| | Mechanical angle | 295.25° | 2.92° |
| 3 | Shooting angle | 343.79° | 2.26° |
| | Offset angle | 311.46° | 0.65° |
| | Mechanical angle | 295.25° | 2.91° |

It is known from comparing the shooting angle of the azimuth and elevation recorded by the second and the third experiments of the above table with the angle measured by the geodetic survey. The maximum error occurs in the elevation shooting angle 0.15° (2.41°–2.26°) of the first time experiment. The minimum error occurs in the elevation shooting angle 0.01° (2.42–2.41) of the first time experiment and the azimuth shooting angle 0.01° (343.8–343.79°) of the second time experiment. Therefore, since this error has included the errors for the geodetic survey, mechanical precision, and RF calibration, it is fully complied with the system requirement (less than ±0.2°).

In summary, the present invention at least has following advantages:

1. Less calibration cost when compared with using the MGC (magnetic-gyro compass) and the level instrument.

2. Greater calibration precision when compared with using the MGC (magnetic-gyro compass) and the level instrument.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

The invention claimed is:

1. A dish antenna calibration system, suitable for pointing calibration of an antenna system, at least comprising:

a signal source, used to emit a first signal;

an antenna, located in a fixed position, and used to receive the first signal;

a first radio frequency mixer, wherein the first radio frequency mixer is electrically connected to the antenna, so that the antenna can transmit the first signal to the first radio frequency mixer;

a first local oscillator, wherein the first local oscillator is electrically connected to the first radio frequency mixer and used to generate a second signal; the second signal is subsequently transmitted to the first radio frequency mixer in which the second signal is mixed with the first signal and thus a third signal is formed after the frequency is reduced;

an energy detecting device, wherein the energy device is electrically connected to the first radio frequency mixer, so that the first radio frequency mixer can transmit the third signal to the energy detecting device and the power of the third signal can be measured by the energy detecting device;

a personal computer, wherein the personal computer is electrically connected to the energy detecting device, so that the power of the third signal that has measured can be transmitted to the personal computer, and the measured power value can be calculated and compared by the personal computer; and a servo amplifier, wherein the servo amplifier is electrically connected to the personal computer, and after the measured power value is calculated and compared by the personal computer, the personal computer outputs an angle control signal, the angle control signal is subsequently amplified by the servo amplifier so as to continuously drive the antenna scanning until the antenna is aimed at the first signal emitted by the signal source.

2. The antenna calibration system of claim 1, wherein the first signal comprises a RF signal.

3. The antenna calibration system of claim 1, wherein the energy detecting device comprises a second local oscillator, and the second local oscillator is suitable for outputting a signal to the second radio frequency mixer and at least comprises:

a direct digital synthesizer, wherein the direct digital synthesizer is used to generate a digital signal;

a digital to analog converter, wherein the digital to analog converter is electrically connected to the direct digital synthesizer and is used to covert the digital signal generated by the direct digital synthesizer to an analog signal;

a lowpass filter, wherein the lowpass filter is electrically connected to the digital to analog converter and is used to filter the signal with higher frequency inside the input analog signal, so that the signal with lower frequency inside the analog signal can pass the lowpass filter; and an amplifier, wherein the amplifier is electrically connected to the lowpass filter and is used to amplify the signal with lower frequency to a fourth signal and further input the fount signal to the second radio frequency mixer.

4. The dish antenna calibration system of claim 1, wherein the energy detecting device is used to receive the third signal generated by the first radio frequency mixer, at least comprising:

a second local oscillator, used to generate a fourth signal;

a second radio frequency mixer, wherein the second radio frequency mixer is electrically connected to the second local oscillator, and a fourth signal input from the second local oscillator is mixed with the third signal that is input to the second radio frequency mixer, so as to generate a fifth signal after its frequency is reduced;

a bandpass filter, wherein the bandpass filter is electrically connected to the second radio frequency mixer, so that the second radio frequency mixer can transmit the fifth signal to the bandpass filter in which a portion of the fifth signal can be filtered, and the portion of the fifth signal That is not filtered can pass the bandpass filter;

a logarithm amplifier, wherein the logarithm amplifier is electrically connected to the bandpass filter, so that the bandpass filter can transmit the portion of the fifth signal that is not filtered to the logarithm amplifier, and the portion of the fifth signal that is not filtered is amplified by the logarithm amplifier; and a voltage which is proportional to the input power of the logarithm amplifier is output;

an analog to digital converter, wherein the analog to digital converter is electrically connected to the logarithm amplifier, so that the logarithm amplifier can transmit the voltage which is proportional to the input power of the logarithm amplifier, and the analog to digital convert is used to convert the voltage into a digital signal; and a microcontroller, wherein the microcontroller is electrically connected to the analog to digital converter, so that the digital signal can be processed in the microcontroller so as to obtain all the power value.

5. The dish antenna calibration system of claim 1, wherein the fifth signal comprises an intermediate frequency signal.

6. A calibration method for a dish antenna system, suitable for obtaining an azimuth offset angle and an elevation offset angle of the antenna system, comprising the following steps:

(a) a calibration point being selected first, after an inclination $\Theta_{cal}$ from a true north 0° is precisely measured via an geodetic survey, then a signal source being placed on the calibration point, and a signal generated by the signal source being received by the antenna;

(b) the antenna being first aimed at the signal source and a fast scanning of ±10 degrees (each interval ≦0.5 degree) being performed so as to draw a diagram of the received power, and the antenna being subsequently aimed to an orientation with a maximum signal power;

(c) the antenna being aimed to a second time at the signal source and a big azimuth scanning with an interval ≦0.2 degree being performed to obtain a maximum value of the signal power and an inclination $\Theta_p$ between the antenna and the signal source;

(d) the antenna being aimed to a third time at the signal source, a position with a power of 3dB attenuation being measured and a small azimuth scanning with an interval less than 0.05 degree being performed to measure the position of another point having the same power as a symmetric beam, and an arithmetic mean of these two positions being the azimuth value $\Theta_{az}$;

(e) obtaining an elevation angle value $\Theta_{el}$ by performing the same as the stops used to obtain the azimuth value $\Theta_{az}$;

(f) obtaining the $\Theta_{az}$ and the $\Theta_{el}$, and the $\Theta_{az}$, wherein the $\Theta_{el}$ pointed by the antenna are used as a center and a deviation angle ($\Delta\varnothing$=0.5 degree) is used as a radius to scan the antenna (like a conical scan); moreover, the power received by the antenna is used as a radius for drawing a diagram of the power received by the antenna, wherein if die power diagram is a circle or a symmetric ellipse, it means a pointing position of the antenna is right at the center position of the signal source;

(g) obtaining an azimuth offset angle $\Theta_{off}$ by subtracting the $\Theta_{az}$ from the $\Theta_{cal}$ wherein the offset angle $\Theta$off the azimuth and the elevation also can be obtained by using the same method; and (h) locating the signal source on the other calibration position and obtaining a position T of the calibration point from the precise measurement of the geodetic survey, wherein the inclination between the position T and the true north 0° is $\Theta_T$, and repeating the steps (b)~(f) so as to obtain an inclination $\Theta_{ilr}$ between the signal source and the true north 0°, and $\Theta_{ilr}$ is between $\Theta_T+0.2°$ and $\Theta_T-0.2°$.

* * * * *